(12) United States Patent
Belghoul et al.

(10) Patent No.: US 10,172,150 B2
(45) Date of Patent: Jan. 1, 2019

(54) TTI SCHEDULING FOR IMPROVED RAMP UP OF TCP THROUGHPUT IN CELLULAR NETWORKS

(71) Applicant: Apple Inc., Cupertino, CA (US)

(72) Inventors: Farouk Belghoul, Campbell, CA (US); Matthias Sauer, San Jose, CA (US); Lydi Smaini, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/485,646

(22) Filed: Apr. 12, 2017

(65) Prior Publication Data

US 2017/0339711 A1    Nov. 23, 2017

Related U.S. Application Data

(60) Provisional application No. 62/339,533, filed on May 20, 2016.

(51) Int. Cl.
  *H04W 72/12* (2009.01)
  *H04W 72/04* (2009.01)
  (Continued)

(52) U.S. Cl.
  CPC ....... *H04W 72/1257* (2013.01); *H04L 1/0002* (2013.01); *H04L 69/166* (2013.01);
  (Continued)

(58) Field of Classification Search
  CPC ................... H04W 72/1252–72/1257; H04W 72/1263–72/1294; H04L 1/0002; H04L 69/166
  See application file for complete search history.

(56) References Cited

U.S. PATENT DOCUMENTS 8,811,335 B2  8/2014  Yavuz et al.
9,131,498 B2  9/2015  Au et al.
(Continued)

OTHER PUBLICATIONS

International Search Report and Written Opinion, Application No. PCT/US2017/033506, dated Sep. 13, 2017, 18 pages.
(Continued)

*Primary Examiner* — Eric Myers
(74) *Attorney, Agent, or Firm* — Meyertons Hood Kivlin Kowert & Goetzel, P.C.; Jeffrey C. Hood

(57) ABSTRACT

A wireless device, such as a user equipment device (UE), and a base station are disclosed, which may communicate with more efficient use of dynamic transmit time interval durations to enable a faster and more efficient ramp up of TCP communications to a higher or maximum throughput. The UE may communicate uplink or downlink communications with the base station according to a first shorter TTI duration for a first period of time. After the first period of time, the UE may communicate uplink or downlink communications to the base station according to a second longer TTI duration. For the case of uplink communications, the UE may be configured to increase a congestion window size after each acknowledgement of an uplink communication received by the base station during the first period of time. For the case of downlink communications, the base station may be configured to increase a congestion window size after each acknowledgement of a downlink communication received by the UE during the first period of time.

20 Claims, 8 Drawing Sheets

(51) Int. Cl.
*H04W 28/02* (2009.01)
*H04L 1/00* (2006.01)
*H04L 29/06* (2006.01)
*H04L 12/807* (2013.01)
*H04L 12/841* (2013.01)

(52) U.S. Cl.
CPC ... *H04W 28/0273* (2013.01); *H04W 72/0446* (2013.01); *H04W 72/1268* (2013.01); *H04L 47/27* (2013.01); *H04L 47/28* (2013.01)

(56) References Cited

U.S. PATENT DOCUMENTS

| | | |
|---|---|---|
| 9,215,041 B2 | 12/2015 | Lohr et al. |
| 2016/0249329 A1 | 8/2016 | Au et al. |
| 2017/0019886 A1 | 1/2017 | Patel et al. |
| 2018/0070263 A1* | 3/2018 | Falconetti ......... H04W 28/0273 |

OTHER PUBLICATIONS

NTT Docomo, Inc.; "Discussions on TTI shortening"; 3GPP Draft; R1-163175, 3rd Generation Partnership Project (3GPP), Mobile Competence Centre ; 650, Route Des Lucioles ; F-06921 Sophia-Antipolis Cedex; France; vol. RAN WG1, no. Busan, Korea; Apr. 11-15, 2016; XP051079880; Retrieved from the Internet: URL:http://www.3gpp.org/ftp/tsg_ran/WG1_RL1/TSGR1_84b/Docs/ [retrieved on Apr. 1, 2016].

Mediatek Inc.; "System-level performance evaluation for TCP throughput enhancement with dynamic TTI tuning"; 3GPP Draft; R1-163798_System_Level_Evaluation_For_Shortened_TTI_ MTK, 3rd Generation Partnership Project (3GPP), Mobile Competence Centre ; 650, Route Des Lucioles ; F-06921 Sophia-Antipolis Cedex; France; vol. RAN WG1, no. Busan; Apr. 11-15, 2016; XP051090323; Retrieved from the Internet:URL:http://www.3gpp.org/ftp/tsg_ran/WG1_RL 1/TSGR1_84b/Docs/[retrieved on Apr. 22, 2016].

NTT Docomo, Inc.; "DL channel designs for shortened TTI"; 3GPP Draft; R1-163171, 3rd Generation Partnership Project (3GPP), Mobile Competence Centre ; 650, Route Des Lucioles; F-06921 Sophia-Antipolis Cedex; France; vol. RAN WG1, no. Busan, Korea; Apr. 11-15, 2016; XP051079876; Retrieved from the Internet: URL:http://www.3gpp.org/ftp/tsg_ran/WG1_RL 1/TSGR1_84b/Docs/[retrieved on Apr. 1, 2016].

Ericsson; "Areas for latency reduction"; 3GPP Draft; R2-153489 Areas for Latency Reduction, 3rd Generation Partnership Project (3GPP), Mobile Competence Centre ; 650, Route Des Lucioles ; F-06921 Sophia-Antipolis Cedex; France; vol. RAN WG2, no. Beijing, P.R. China; Aug. 24-28, 2015; XP051004201; Retrieved from the Internet: URL:http://www.3gpp.org/ftp/Meetings_3GPP SYNC/RAN2/Docs/ [retrieved on Aug. 23, 2015].

Samsung; "Preliminary system-level performance evaluation for TTI shortening"; 3GPP Draft; R1-156820, 3rd Generation Partnership Project (3GPP), Mobile Competence Centre ; 650, Route Des Lucioles ; F-06921 Sophia-Antipolis Cedex ; France; vol. RAN WG1, no. Anaheim, USA; Nov. 15-22, 2015; XP051003180; Retrieved from the Internet: URL:http://www.3gpp.org/ftp/Meetings_3G PP SYNC/RAN 1 /Docs/ [retrieved on Nov. 15, 2015].

* cited by examiner

TTI SCHEDULING FOR IMPROVED RAMP UP OF TCP THROUGHPUT IN CELLULAR NETWORKS

PRIORITY CLAIM

This application claims benefit of priority to Application No. 62/339,533 titled "TTI Scheduling for Improved Ramp Up of TCP Throughput in Cellular Networks", filed on May 20, 2016, which is hereby incorporated by reference as though fully and completely set forth herein.

FIELD

The present application relates to wireless devices, and more particularly to a method for improved performance in an enhanced cellular network, such as a 5G network.

DESCRIPTION OF THE RELATED ART

Wireless communication systems are rapidly growing in usage. In particular, cellular networks are being used by a number of difference devices and for a number of different services. Newer cellular networks currently under development may be asked to support various advanced services, such as enhanced mobile broadband (eMBB), massive machine type communications (MTC), and critical machine applications such as autonomous cars and similar use cases. Improvements in the field would be desirable.

SUMMARY

Embodiments are presented herein of methods for configuring and performing cellular communication, and of devices configured to implement the methods. According to the techniques described herein, a wireless device such as a user equipment device (UE) may communicate with a base station according to a radio access technology. The UE and the base station may communicate with a more efficient usage of dynamic transmit time interval durations to enable a faster and more efficient ramp up of TCP communications to a higher or maximum throughput.

In some embodiments, the UE may comprise a radio comprising one or more antennas configured for wireless communication on a cellular network, and a processing element operably coupled to the radio. The UE may be configured to transmit uplink communications to the base station according to a first shorter TTI duration for a first period of time, wherein the UE is configured to increase a congestion window size after each acknowledgement of an uplink communication received by the base station during the first period of time, wherein increasing the congestion window size enables a corresponding increase in uplink data throughput. After the first period of time, the UE may be configured to transmit uplink communications to the base station according to a second longer TTI duration.

In some embodiments, the UE may be configured to receive downlink communications from the base station according to a first shorter TTI duration for a first period of time. In these embodiments, after the first period of time, the UE may be configured to receive downlink communications from the base station according to a second longer TTI duration, wherein receipt of the downlink communications from the base station according to the first shorter TTI duration for the first period of time allows the base station to increase a congestion window more rapidly, thereby enabling transmission control protocol (TCP) communications from the base station to ramp up to higher speeds more quickly than if the second longer TTI duration was used during the first period of time.

In some embodiments, the transmission of the uplink communications to the base station according to the first shorter TTI duration for the first period of time allows transmission control protocol (TCP) communications to ramp up to higher speeds more quickly than if the second longer TTI duration was used during the first period of time.

In some embodiments, transmission of the uplink communications to the base station according to the first shorter TTI duration for the first period of time allows the UE to increase the congestion window more rapidly, thereby enabling transmission control protocol (TCP) communications to ramp up to higher speeds more quickly than if the second longer TTI duration was used during the first period of time.

In some embodiments, transmission of the uplink communications to the base station according to the first shorter TTI duration during the first period of time results in a shorter round-trip time (RTT) than if the second longer TTI duration was used during the first period of time. In these embodiments, the UE may be further configured to increase a transmission rate after each uplink communication RTT.

In some embodiments, the first period of time may end in response to detection of a packet loss in the uplink communications. In other embodiments, the first period of time may end in response to a slow start threshold being reached.

In some embodiments, the congestion window size may be used by the UE to avoid transmitting a greater amount of data than can be handled by the network. In these embodiments, UE may be further configured to set the congestion window size initially to a small multiple of a maximum segment size (MSS) allowed on a connection between the UE and the base station, wherein increasing the congestion window size after each acknowledgement of an uplink communication received by the base station comprises increasing the congestion window size after each round trip time.

The techniques described herein may be implemented in and/or used with a number of different types of devices, including but not limited to cellular phones, tablet computers, wearable computing devices, portable media players, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
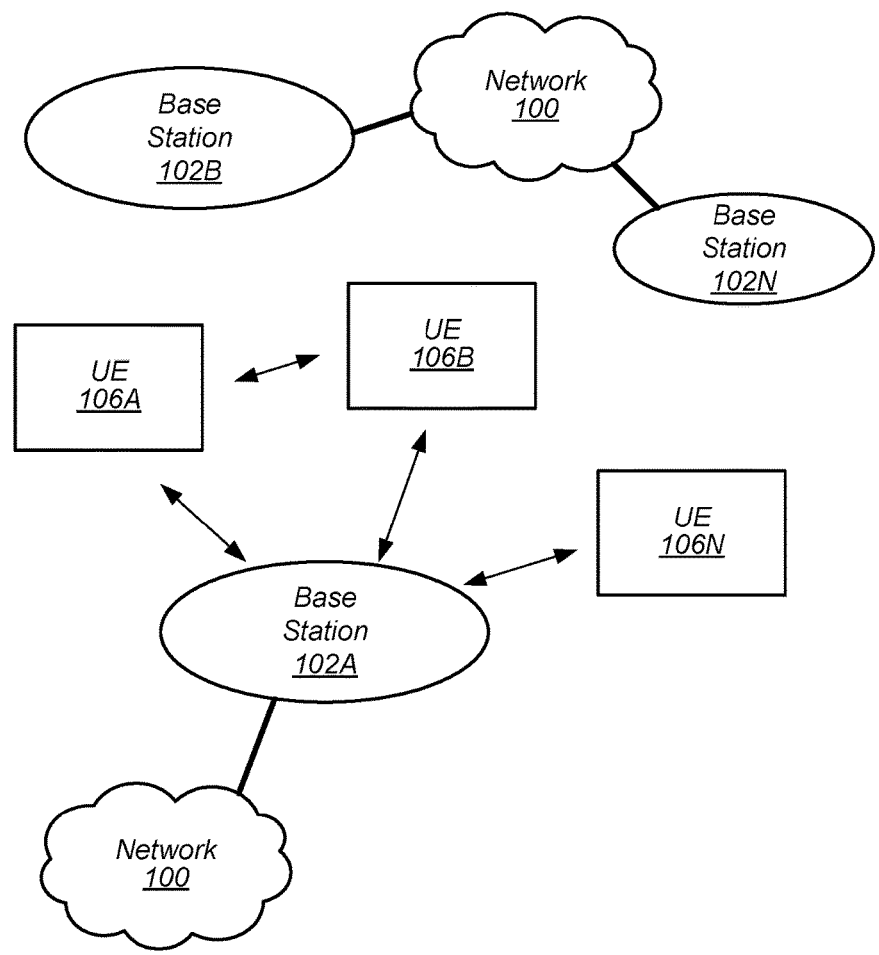
FIG. 1 illustrates an exemplary (and simplified) wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms may be used in the present disclosure.

3GPP: Third Generation Partnership Project
3GPP2: Third Generation Partnership Project 2
BLER: Block Error Rate (same as Packet Error Rate)
BER: Bit Error Rate
CC: Component Carrier
CE: Control Element
DL: Downlink
eMBB: enhanced Mobile Broadband
GBR: Guaranteed Bit Rate
GSM: Global System for Mobile Communications
LTE: Long Term Evolution
MAC: Media Access Control
MME: Mobility Management Entity
MTC: Machine Type Communications
PER: Packet Error Rate
RACH: Random Access Channel
RAT: Radio Access Technology
Rx: Receive
RSRP: Reference Signal Received Power
RSRQ: Reference Signal Received Quality
RRC: Radio Resource Control
TCP: Transmit Control Protocol
Tx: Transmission
TTI: Transmit Time Interval
UE: User Equipment
UL: Uplink
UMTS: Universal Mobile Telecommunication System
VoLTE: Voice Over LTE Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
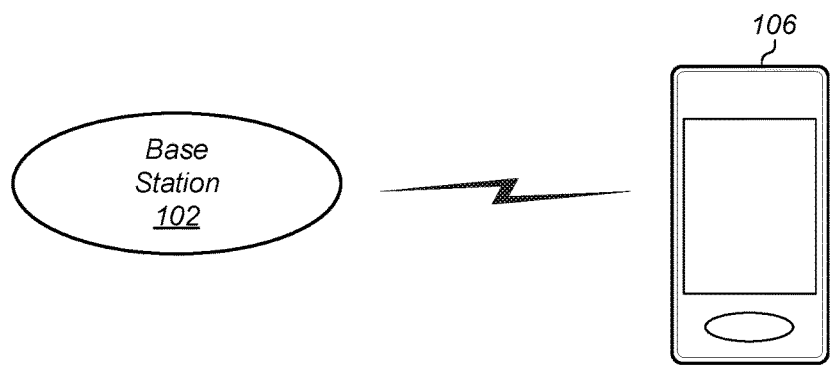
FIG. 2 illustrates a base station (BS) in communication with a user equipment (UE) device.

FIGS. 1 and 2—Communication System

FIG. 1 illustrates an exemplary (and simplified) wireless communication system. It is noted that the system of FIG. 1 is merely one example of a possible system, and embodiments of the invention may be implemented in any of various systems, as desired.

As shown, the exemplary wireless communication system includes a base station 102A which communicates over a transmission medium with one or more user devices 106A, 102B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In addition to "infrastructure mode" communication in which UEs 106 communicate with each other and other networks/devices indirectly by way of base stations 102, some UEs may also be capable of communicating in a "peer-to-peer" (P2P) or "device-to-device" (D2D) mode of communication. In such a mode, UEs 106 such as UE 106A and UE 106B may communicate directly with each other (e.g., instead of by way of an intermediate device such as base station 102A). For example, LTE D2D, Bluetooth ("BT", including BT low energy ("BLE"), Alternate MAC/PHY ("AMP"), and/or other BT versions or features), Wi-Fi ad-hoc/peer-to-peer, and/or any other peer-to-peer wireless communication protocol may be used to facilitate direct communications between two UEs 106.

Note that a UE 106 may be capable of communicating using any of multiple radio access technologies (RATs) or wireless communication protocols, and may be able to communicate according to multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N). The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further alternative, the UE 106 may include one or more radios which are shared between multiple wireless communication protocols, and one or more radios which are used exclusively by a single wireless communication protocol. Other configurations are also possible.

Figure 3:
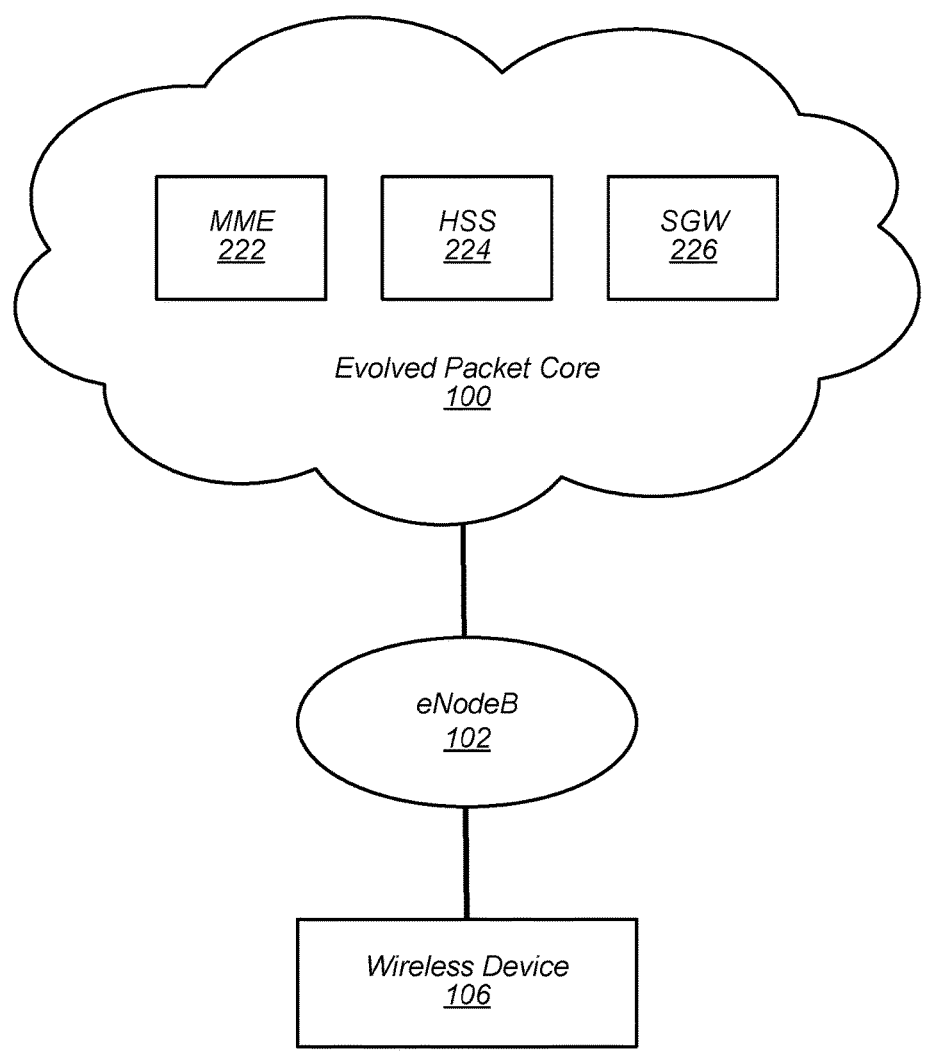
FIG. 3 illustrates an example wireless cellular communication network, according to some embodiments.

FIG. 3—Cellular Network

FIG. 3 illustrates an exemplary, simplified portion of a wireless communication system in an LTE network. Note that references to LTE herein may include present and/or future versions of LTE, for example including LTE-A.

As shown, the wireless device 106 may be in communication with a base station, shown in this exemplary embodiment as an eNodeB 102. For example, the wireless device 106 may utilize an evolved UMTS terrestrial radio access (E-UTRA) air interface to communicate with the eNodeB 102.

In turn, the eNodeB may be coupled to a core network, shown in this exemplary embodiment as an evolved packet core (EPC) 100. As shown, the EPC 100 may include mobility management entity (MME) 222, home subscriber server (HSS) 224, and serving gateway (SGW) 226. The EPC 100 may include various other devices and/or entities known to those skilled in the art as well.

The term "network" as used herein may refer to one or more of the base station 102, the MME 222, the HSS 224, the SGW 226 or other cellular network devices not shown. An operation described as being performed by "the network" may performed by one or more of the base station 102, the MME 222, the HSS 224, the SGW 226 or other cellular network devices not shown.

Figure 4:
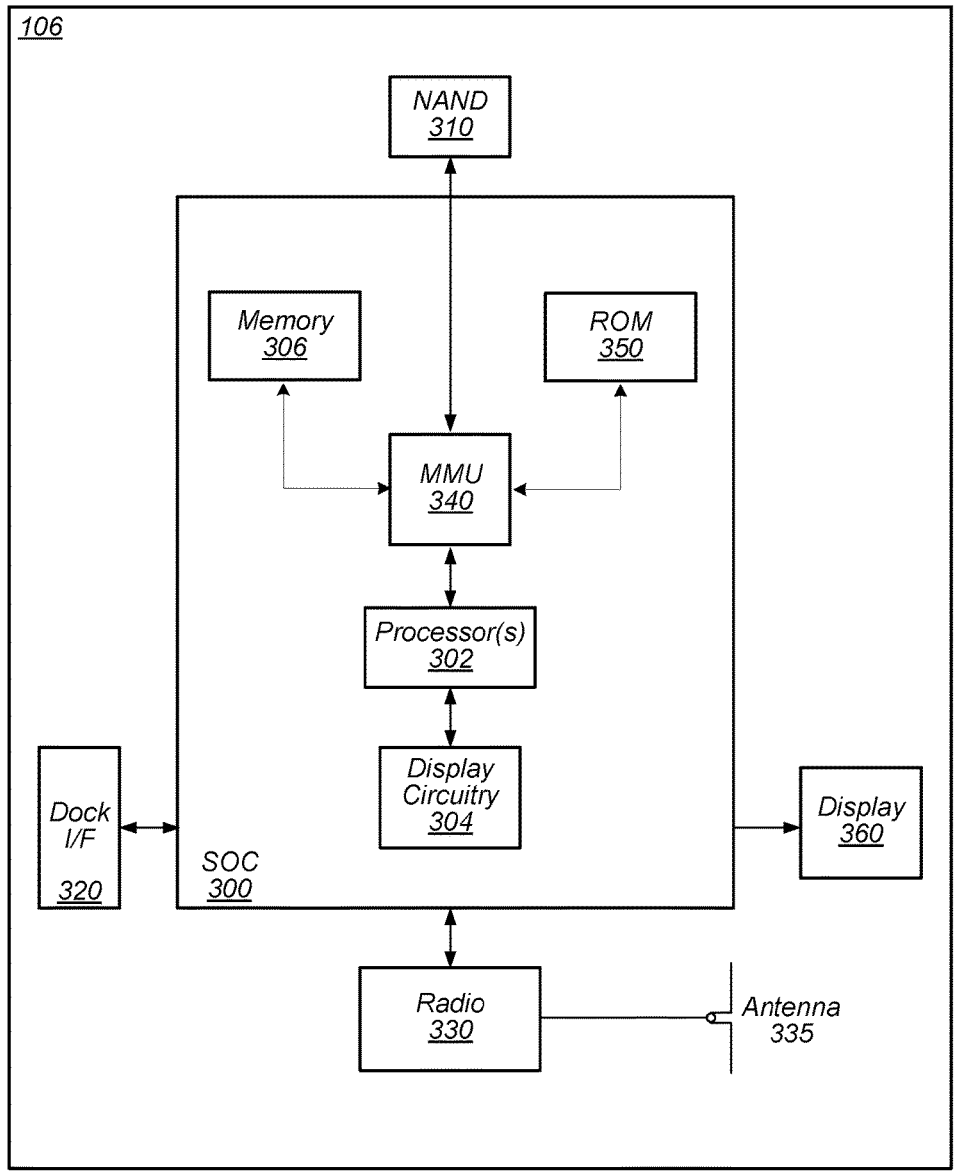
FIG. 4 illustrates an exemplary block diagram of a UE.

FIG. 4—Exemplary Block Diagram of a UE

FIG. 4 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310) and/or to other circuits or devices, such as the display circuitry 304, wireless communication circuitry or radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna 335, and in some embodiments multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

As described further, the UE 106 and/or the base station 102 may include hardware and software components for implementing features or methods described herein in conjunction with cellular communication. For example, the base station 102 and the UE 106 may operate to communicate using cross layer scheduling as described herein.

Figure 5:
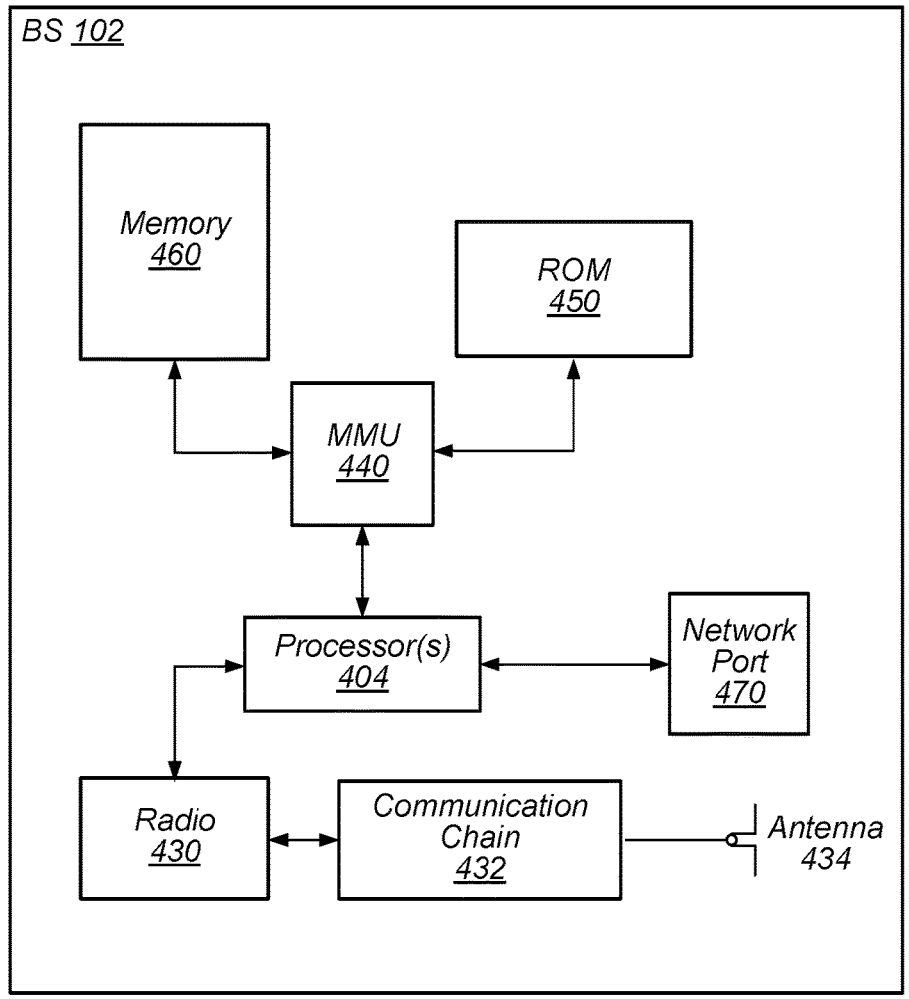
FIG. 5 illustrates an exemplary block diagram of a BS.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition), the processor 302 of the UE device 106, in conjunction with one or more of the other components 300, 304, 306, 310, 320, 330, 335, 340, 350, 360 may be configured to implement part or all of the features described herein FIG. 5—Exemplary Block Diagram of a Base Station FIG. 5 illustrates an exemplary block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, etc.

As described further, the BS 102, as well as various of the network devices in FIG. 3 or otherwise not shown, may include hardware and software components for implementing features such as those described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the BS 102, in conjunction with one or more of the other components 430, 432, 434, 440, 450, 460, 470 may be configured to implement part or all of the features described herein.

Problem Summary

The new 5G network technology, currently in development, is expected to provide new capabilities for UEs, such as higher throughput in the multiple Gbps range. In some embodiments as described in related application No. 62/339,486 titled "Dynamic Frame Structure for an Enhanced Cellular Network", 5G may provide a flexible TTI notion that allows the physical layer to dynamically support different TTI (transmit time interval) sizes ranging from 1 OFDM symbol up to 10 ms. The TCP protocol is expected to remain one of the most used protocols to establish and carry traffic data between two users over the Internet. Devices operating in a 5G network may support TCP with larger transmission and reception windows, enabling a larger maximum throughput. An important problem to solve for a UE in a 5G network is how to allow the UE throughput to ramp up to the maximum sustainable throughput as fast and efficiently as possible, without introducing congestion into the network or adding additional overhead to the data being transmitted.

Methods detailed in the present disclosure propose a slow-start, cross-layer mechanism for ramping up throughput in a UE device operating under 5G technology. Some embodiments described herein relate to cross layer mechanism between TCP and Layer1/Layer2 to improve the round trip time (RTT) and reduce the overhead based in the TCP window state.

Enhanced Cellular Standards (5G)

Current cellular networks are based on the Long Term Evolution (LTE) network, which was an advance over prior 3G technologies. However, the LTE network has some areas that can be improved. For example, current cellular networks face a shortage of spectrum, being limited to 100 MHz. Newer radio access technologies (RATs), such as the 5G network standard currently in development, should preferably be flexible and scalable to support a greater number of frequency bands, from 400 MHz to 100 GHz.

Newer RATs should also offer improved service flexibility. 4G networks introduced and supported only mobile broadband (MBB), whereas newer 5G networks should be sufficiently flexible to support more advanced services, such as enhanced mobile broadband (eMBB), massive machine type communications (MTC), which may have both low power and very high density requirements, and critical machine applications such as autonomous cars and similar use cases which require high reliability and may operate more efficiently with very short transmission time intervals (TTIs). As one example, eMBB may require additional flexibility in the radio access technology, e.g., it may be desirable for the RAT to be applications aware and be able to support a cloud based radio access network (RAN). To attain eMBB, it may also be desirable to increase the capacity of current cellular networks through massive deployment of small cells, high frequency reuse, and splitting of the Control and User (C/U) planes of the radio link. New RATs should also be sufficiently flexible for future enhancements and support both licensed and unlicensed spectrum.

Cellular networks are currently used to support voice and data communications as well as various specific applications, such as sensor network monitoring, cloud capabilities, video streaming, automotive communications, real time gaming, remote control of devices, videoconferencing, and disaster alerts, among others. However, newer cellular RATs should be sufficiently flexible to support future applications, such as autonomous driving, augmented reality, virtual reality, and tactile Internet, among numerous others.

Cellular Frame Structure Design in Future Cellular Networks

In some embodiments, different services such as MTC, eMBB, critical time applications, etc., utilize different transmit time interval (TTI) durations. MTC applications can have a longer TTI because of the nature of its power consumption. In contrast, eMBB and critical time applications may operate more efficiently with a shorter TTI.

Cellular transmissions should also be constrained in time and space to allow for coexistence with other technologies. In the current LTE standard, the resource elements could be spread over 20 MHz and over a 1 ms TTI. This results in reduced efficiency when the spectrum is shared with multiple services or use license assisted access (LAA) services.

Thus in some embodiments it may be desirable that radio resources allocated for control should be dynamic (non-static) to "fit" the dynamic TTI size of these different applications. In static TDD, the network may define a 10 ms frame format where the transmission sequence may be downlink, downlink, followed by uplink, uplink. In dynamic TDD the TDD format can be changed, and further the TDD format used by two base stations may be different. One problem with TDD is that transmission and reception are performed at the same frequency. If two neighboring base stations are operating where one is performing transmission and one is performing reception, a mechanism is desired to help the base stations avoid interference. A dynamic TDD solution may be utilized to improve transmission quality and accommodate higher frequencies. It is noted that an FDD solution may also be used for certain markets In some embodiments, cross layer communication may be introduced, such as the provision of TCP/UDP and application type as part of the transmission of TTI/resource size information. It would also be desirable for the base station (eNB) to be able to configure device to device (D2D) resources dynamically when two or more UEs are in range, enabling the two or more UEs to communicate directly with each other to reduce delay. Further, to avoid complexity when performing carrier aggregation, carriers may range from 10 to 200 MHz. Finally, it may be desired to use the same TTI frame both in licensed and unlicensed spectrum.

Figure 6:
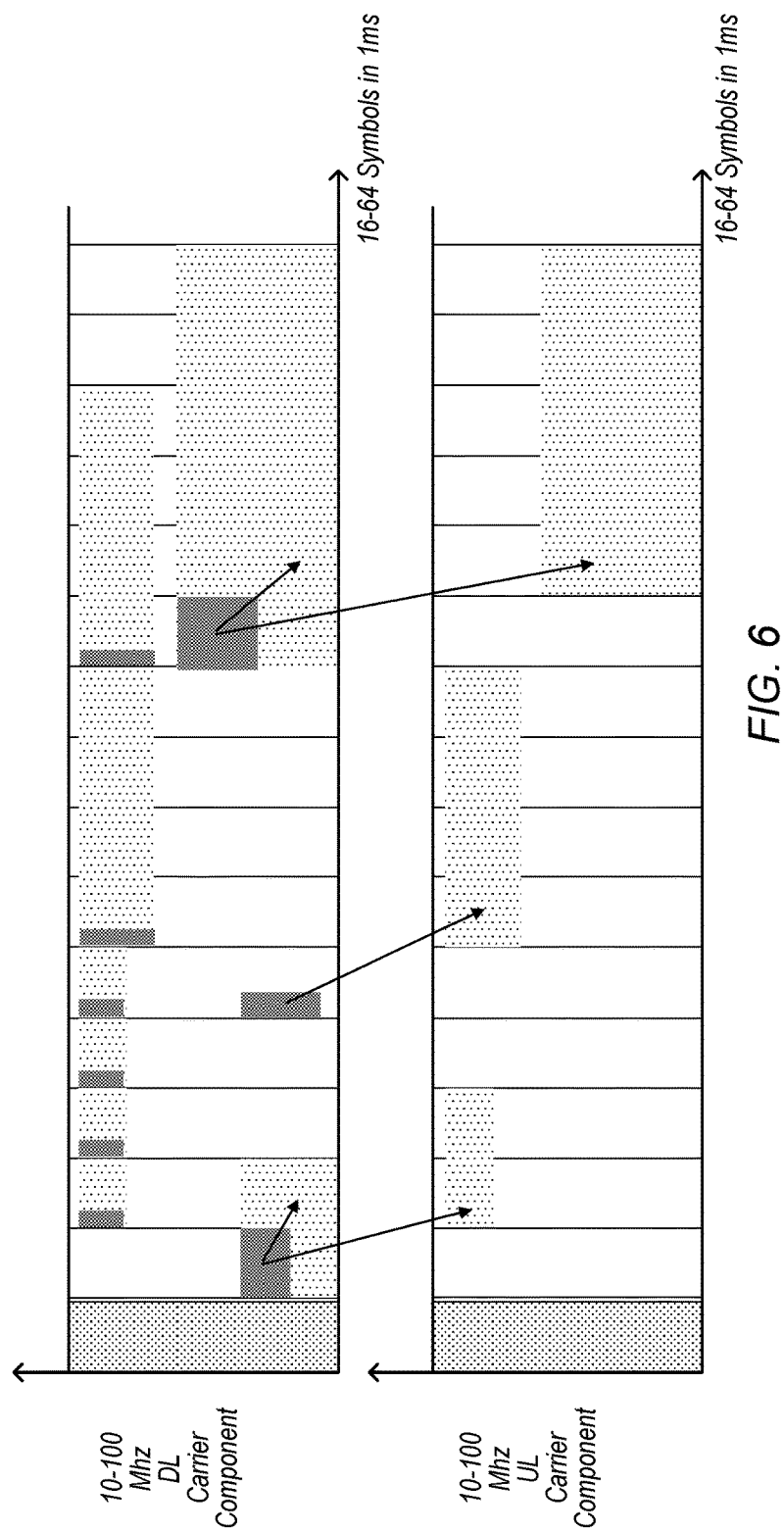
FIG. 6 illustrates an example frame structure for a 5G cellular RAT.

FIG. 6—FDD Frame Structure

FIG. 6 illustrates a frame structure for frequency division duplexing (FDD) according to some embodiments, specifically a FDD self-contained frame with downlink/uplink scheduling. In FDD communications, different frequencies are defined for use in the downlink and the uplink. As shown, one 10-100 MHz carrier component may be used for downlink, and one 10-100 MHz carrier component may be used for uplink. In the example shown in FIG. 6, after the pilot symbol is transmitted in the initial 10 ms frame, control information in the control channel (PDCCH) (shaded) sent in the downlink carrier may indicate both where data resides in the downlink and also where the UE is allowed to transmit HARQ feedback (ACK/NACK) in the uplink.

Header Layers

Each TTI data transmission sent over TCP or UDP may be encapsulated in different headers in 5G protocol stacks, and each transmission of this encapsulated data over the physical layer is signaled using control signaling over the air (Radio Resources allocation). Typically, a data transmission will include Layer 1 (L1) overhead that comprises control signaling for a dedicated or shared control channel, and Layer 2 (L2) overhead that includes a PDCP header, RLC header, MAC header, and CRC. Because the L1 and L2 overheads are of a fixed size per data transmission, the ratio of L1+L2 overhead to data size will be inversely proportional to the TTI. In other words, because the L1 and L2 overheads require a fixed amount of time for transmission, a larger TTI results in a larger percent of the transmission time being dedicated to data transmission. This improvement of data transmission efficiency for a longer TTI is generally desirable. However, if the end-to-end delay or the round trip time (RTT) is more important than the overhead-to-data ratio for a particular data transmission, a shorter TTI may be desirable for that transmission, in order to reduce the RTT.

Overview of the Fast Ramp Up Algorithm

The TCP congestion window represents the number of bytes that can be outstanding at any time by a sender (the transmitting device), and hence represents the throughput of the sender. When a connection is set up, a congestion window may be maintained by the sender. In various embodiments, the sender may be either of a user equipment (UE), or a base station (BS). For example, in the case of uplink communications, the UE may be the sender and the BS may be the receiver, while for downlink communications, the BS may be the sender while the UE may be the receiver. The congestion window may be used, in conjunction with other algorithms, to avoid sending more data than the network is capable of transmitting, i.e., to avoid causing network congestion. At least some embodiments described here may operate to increase the congestion window more rapidly and efficiently, thus achieving a higher, or maximum, throughput more quickly than in prior systems.

In some embodiments, the congestion window is set initially to a small multiple of the Maximum Segment Size (MSS) allowed on that connection. A slow start mechanism is used by the sender to determine the receiver's congestion window. Upon completion of a data transmission, the sender may receive a transmission control protocol acknowledgment (TCP-ACK) message from the receiver. Upon receipt of the TCP-ACK message, the sender may increase its congestion window for the subsequent data transmission. For example, the sender may double its window on receipt of the ACK/NACK. This has the effect of increasing the sender's congestion window each RTT. The congestion window may be iteratively increased for each data transmission until either: 1) a loss is detected, or 2) the receiver's advertised window (rwnd) limits a congestion window increase, 3) a slow-start threshold (ssthresh) is reached, or 4) a timer is expired. If a loss event occurs, the algorithm assumes it is due to network congestion and takes steps to reduce the offered load on the network.

Because the congestion window increases each RTT, and because decreasing the TTI duration causes an effective decrease of the RTT, smaller TTI durations will significantly reduce the amount of time required for the sender to ramp up to the maximum allowed congestion window. This fast ramp up allows the UE or base station to reach a higher TCP throughput in a very short duration. For example, this fast ramp up allows the UE or base station to reach a maximum TCP throughput in a very short duration.

Figure 7:
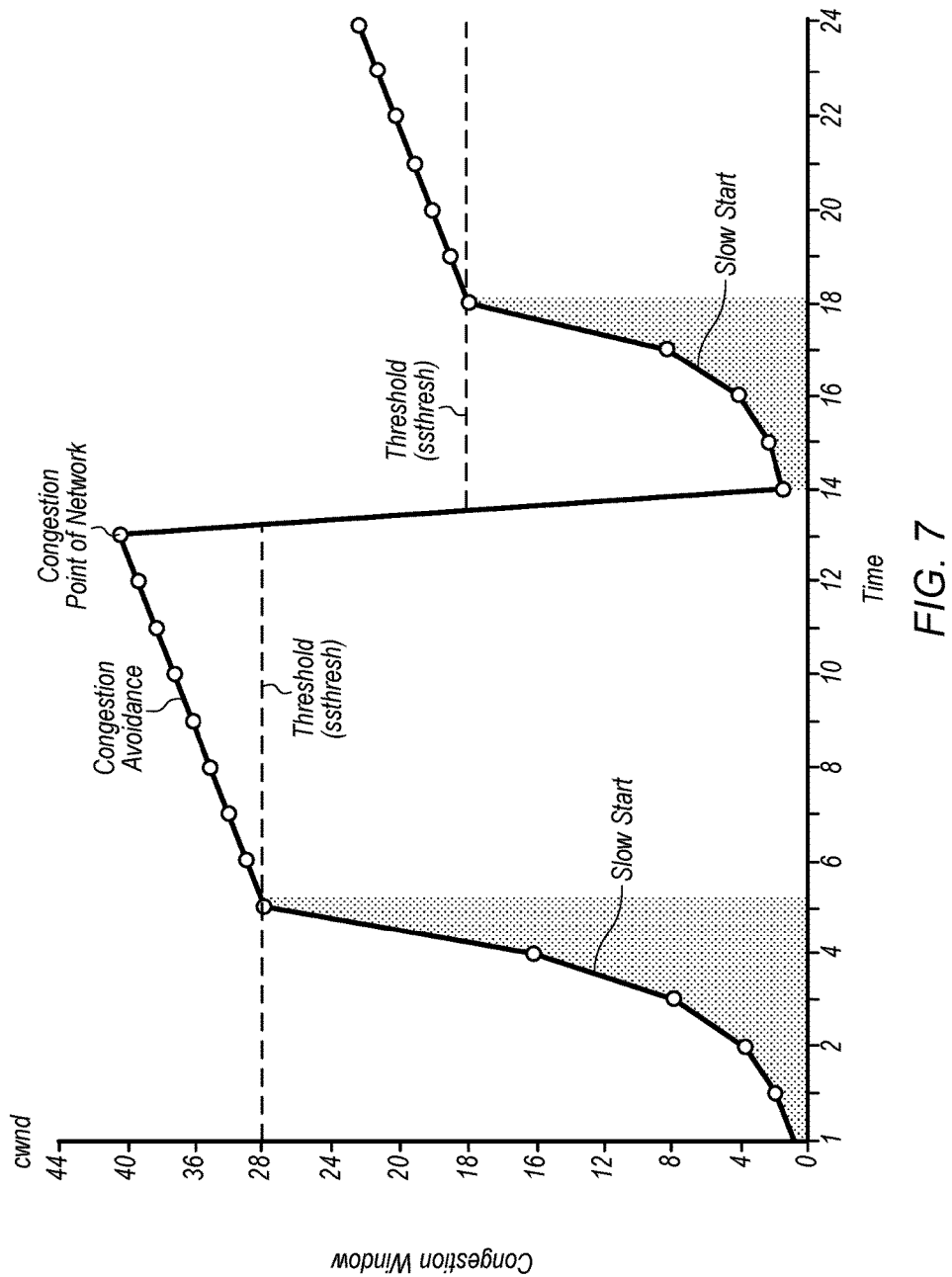
FIG. 7 is a chart illustrating a faster ramp up of a TCP congestion window, and hence a faster increase of communication throughput, according to at least some embodiments described herein.

FIG. 7—TCP Congestion Window Mechanisms

FIG. 7 is a chart which plots the sender's congestion window vs. time for a typical execution of the slow-start algorithm. From the start until approximately t=5, the slow start algorithm quickly ramps up the congestion window. At t=5, the congestion window reaches the ssthresh threshold and begins a congestion avoidance phase that is marked by a more gradual, linear increase in the congestion window. Around t=13 seconds, a congestion point is reached in the network and the sender's congestion window is reset to the initial value at t=14. The slow start algorithm is then implemented again, with a new, smaller value of the ssthresh threshold.

The "slow start threshold" may be a preset threshold at which the UE or the base station will discontinue using the shorter TTI and may begin using a higher (or more normal) TTI. A benefit of the shorter TTI duration is that it allows a faster ramp up of the data throughput, e.g., it allows faster ramp up of the congestion window size, and hence allows faster increases in data throughput. A drawback of this shorter TTI duration is increased relative overhead. Since the amount of data transmission overhead is fixed, the shorter TTI duration results in less data transfer per TTI, meaning that this fixed overhead is spread over a smaller amount of data, resulting a higher percentage of overhead per amount of data transferred. A benefit of the higher (or normal) TTI duration is that this fixed overhead is spread over a larger amount of data transferred, resulting in a lower percentage of overhead per amount of data transferred. Thus it is desirable to switch over from the low TTI duration to the higher, or more normal, TTI duration at some point.

As shown in FIG. 7, the "slow start threshold" may be adjusted based on various criteria, e.g., if it has been determined that the ramp up of the congestion window in an earlier iteration may have been performed too quickly, resulting in network congestion, etc.

Relation Between TCP Window, Throughput TTI Duration, and Overhead

In order to benefit from both Congestion Window fast ramp and the improved overhead for data transmission, the Downlink and Uplink TCP sessions may be configured to operate as follows:

When the TCP session begins, the UE may notify the base station that the TCP session has started. The base station (eNB) may then configure the UE with a small, preferably the smallest, transmit time interval (1 or 2 symbol TTI) in order to reduce the TCP round trip time (RTT) (even though this results in a higher overhead). This may allow the TCP throughput to ramp up faster to max throughput. When the TCP window reaches its maximum value, the UE may notify the base station. Alternatively, the base station may use a timer to configure the UE with a longer TTI (14-16 symbol TTI) in order to improve the efficiency of TCP and reduce the Layer 2/Layer 1 Overhead. For uplink transmission, the UE may notify the network also when it enters in Slow start mode during the TCP session.

Uplink TCP Session

The following describes the uplink transmission operations by a UE and a base station. First, a TCP software stack in the UE may be configured with a maximum throughput value. The TCP software stack may execute in the application processor of the UE. When the start of a new TCP session is detected, the UE's congestion window may be set to a minimum value, and the UE may check if the communication is through an enhanced cellular network, e.g., a 5G network. If so, a notification (an IPC message) may be sent to the 5G MAC software layer and the RRC software layer in the UE. The MAC software layer in the UE may use this information, in addition to other parameters such as targeted TCP max throughput, to send a MAC-CE or PHY message to the base station requesting a shorter TTI duration. The base station may then use this information to configure the UE with a shorter TTI (1 or 2 OFDM symbols). The base station may also configure the UE with contention based uplink resources in addition to a shorter TTI for this period.

The UE may proceed to communicate uplink data with the BS according to the shorter TTI duration. The BS may be configured to transmit a TCP-ACK message to the UE upon receipt of each uplink data communication. The UE may be configured to increase the congestion window upon receipt of each TCP-ACK message. The TCP stack in the UE may continue monitoring the UE's congestion window state, and when a maximum or threshold value is reached for the congestion window, it may generate a new IPC message to the UE MAC layer. The UE MAC layer may then the base station that the UE's congestion window has reached a maximum or threshold value and that the slow start is ending. At this point, the base station may switch the TTI scheduling for the UE to a normal TTI duration (14-16 OFDM symbols), which allows for a more efficient overhead-to-data ratio. If a slow start is detected again during the TCP session, the UE may use the same mechanism to inform the base station, and the process is repeated.

Figure 8:
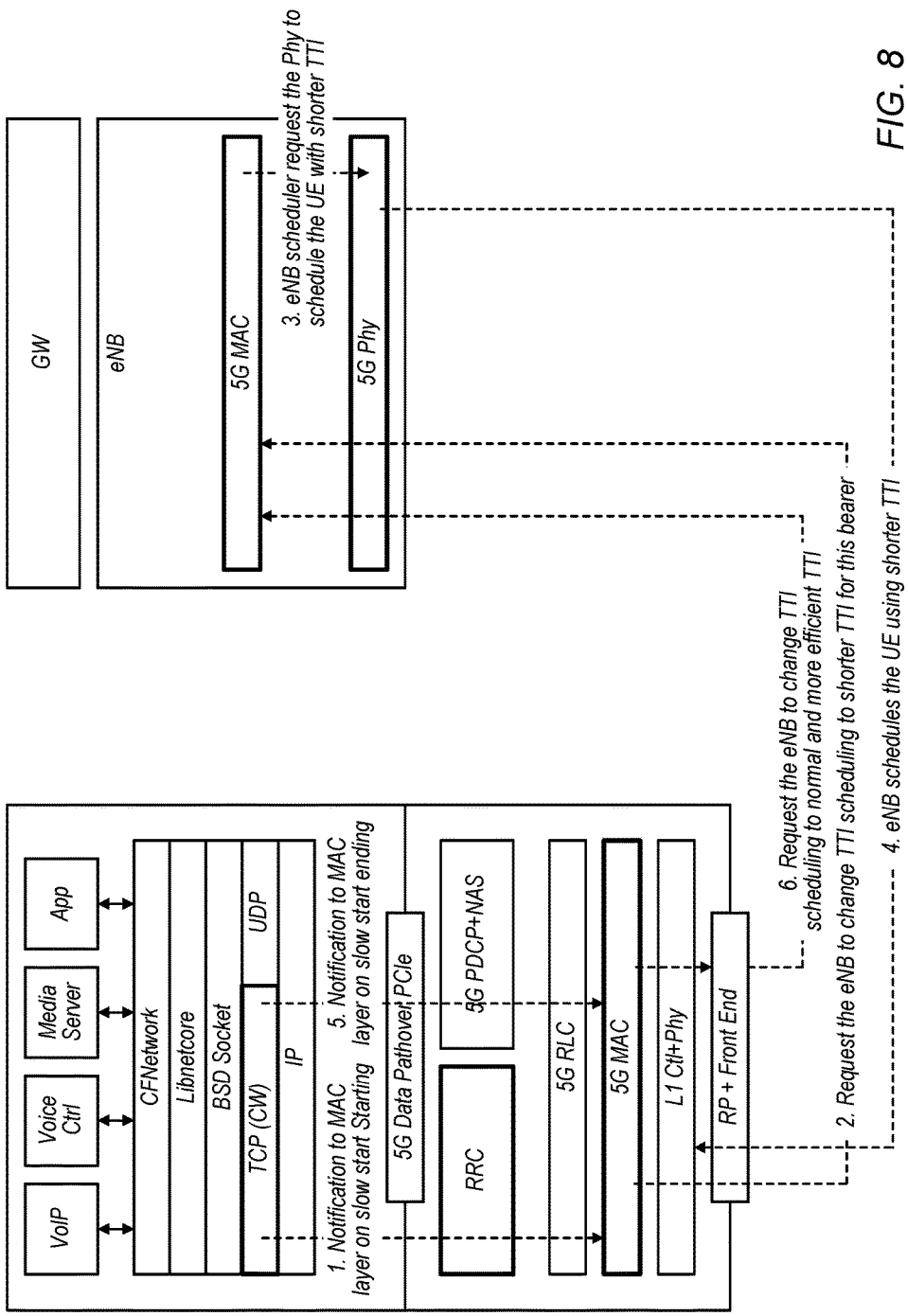
FIG. 8 illustrates a cellular system architecture for performing uplink TCP sessions according to some embodiments.

FIG. 8—Uplink TCP Session, UE Architecture

FIG. 8 is a block diagram showing the components of an exemplary UE and base station (eNB), overlaid with the steps involved in for the slow-start algorithm for an uplink TCP session. As shown, the system of FIG. 9 includes a UE, a base station, and a network gateway coupled to the base station. The UE may comprise various software layers, including TCP and UDP layers, an IP layer, an RRC layer, a 5G PDCP (Packet Data Convergence Protocol) and NAS layer, a 5G RLC (Radio Link Control) layer, a 5G MAC (Media Access Control) layer, and an L1 or Phy layer which coupled to an RF front end. The base station may comprise a 5G MAC layer and a 5G Phy layer, among other possible layers.

At 1 the TCP layer in the UE notifies the 5G MAC layer in the UE regarding the beginning of the slow start.

At 2 the UE requests the base station to change the TTI scheduling to a shorter TTI duration for this bearer. More specifically, the 5G MAC layer in the UE may send a message to the 5G MAC layer in the base station requesting the base station to change the TTI scheduling to a shorter TTI duration for this bearer.

At 3 the base station scheduler in the 5G layer requests the Phy portion (logic) to schedule the UE with a shorter transmit time interval (TTI) duration.

At step 4 the base station schedules the UE using the shorter TTI.

At step 5 the TCP layer in the UE notifies the 5G MAC layer that the slow start is ending.

At step 6 the UE requests the base station to change the TTI scheduling to a normal TTI duration.

Downlink TCP Session

The following describes the uplink transmission operations by a UE and a base station (BS). The downlink TCP method operates similarly to the uplink method, with several key differences. In a downlink TCP session, the TCP congestion window is maintained at a remote device or server, (e.g., at the BS in some embodiments) and the UE may have no exact knowledge of the sender's TCP window state. However, the UE does know when the session starts and can measure the received throughput at any moment. For a downlink TCP session, a generic slow start algorithm may be employed, wherein, after initiating a TCP session with a remote server, the UE may send a notification to the base station in order to switch to a shorter TTI duration. This may occur in a comparable manner to that detailed for uplink transmission. In response to the notification to switch to a shorter TTI duration, the BS may proceed to communicate downlink data with the UE according to the shorter TTI duration for a first period of time. The UE may be configured to transmit a TCP-ACK message to the BS upon each receipt of downlink data from the BS. The BS may be configured to increase the congestion window upon each reception of a TCP-ACK message from the UE. In other words, the BS may be configured to increase a congestion window each round-trip time (RTT) for transmissions with the shorter TTI duration.

In some embodiments, when the notification is sent to the base station, a timer may be started. In these embodiments, upon completion of the timer, the UE may send a notification to the base station to switch to a normal TTI duration, in a manner similar to that employed for an uplink session. In an alternative embodiment, the timer could be maintained at the base station. In other embodiments, the UE may send a notification to the base station to switch to a normal TTI duration in response to detection, by the UE, of a packet loss in the downlink communications. In other embodiments, the base station may determine to switch to a normal TTI duration in response to detection, by the BS, of a packet loss in the downlink communication. In these embodiments, the BS may send a notification to the UE of the switch to a normal TTI duration.

In some embodiments, either of the UE or the BS may be configured to initiate the switch to a normal TTI duration based on the downlink transmission rate reaching a slow start threshold. For example, in some embodiments the UE may send a notification to the base station to switch to a normal TTI duration in response to the downlink transmission rate reaching a slow start threshold. In other embodiments, the BS may switch to a normal TTI duration, and send a notification to the UE of the switch, in response to the downlink transmission rate reaching a slow start threshold.

Figure 9:
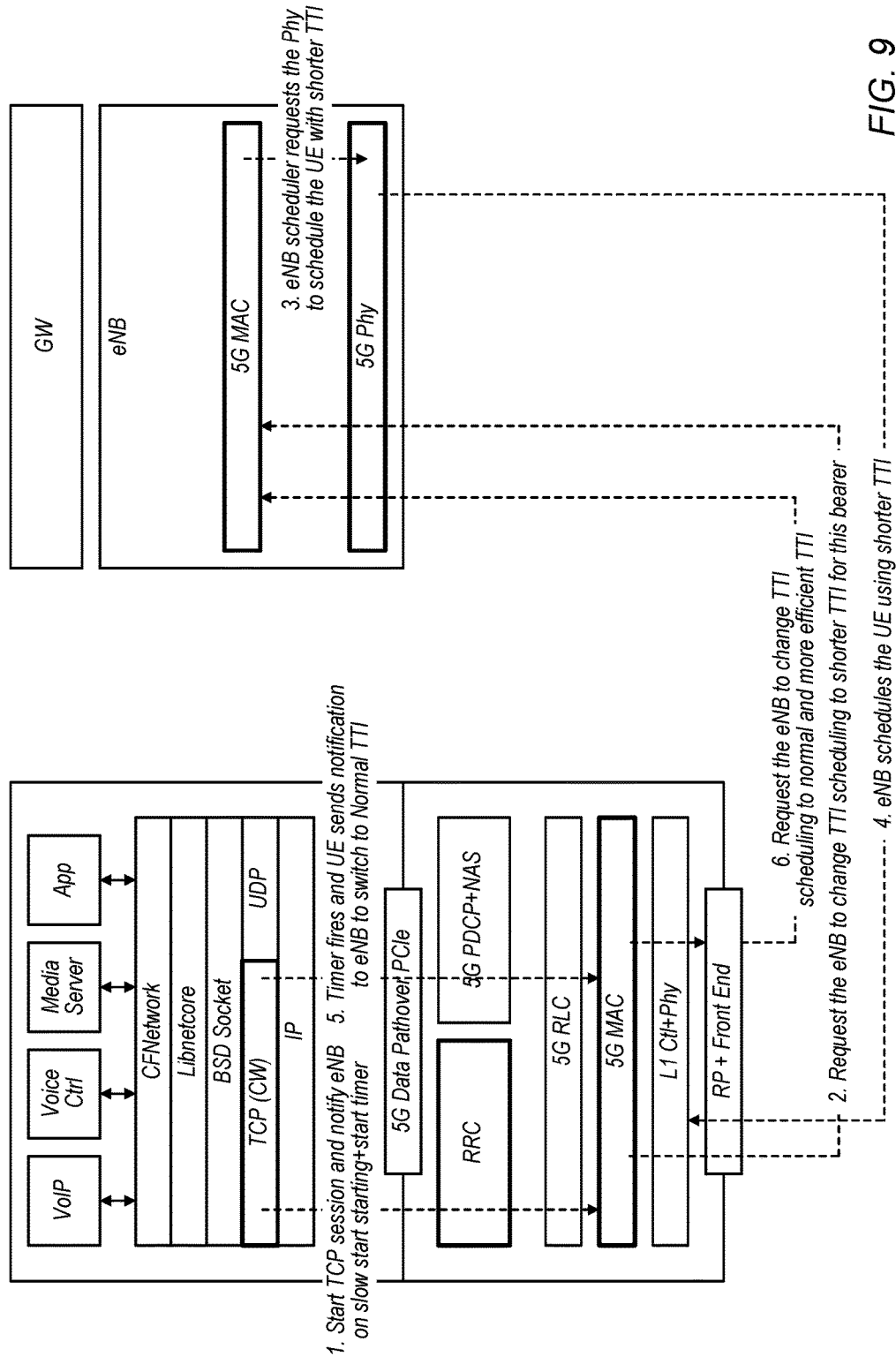
FIG. 9 illustrates a cellular system architecture for performing downlink TCP sessions according to some embodiments.

FIG. 9—Downlink TCP Session, UE Architecture

FIG. 9 is a block diagram showing the components of an exemplary UE and base station (eNB), overlaid with the steps involved in for the slow-start algorithm for a downlink TCP session. The various components and software layers in the UE and the base station may be similar to that shown in FIG. 8.

At 1 the TCP layer in the UE notifies the 5G MAC layer in the UE regarding the beginning of the slow start and also starts a timer.

At 2 the UE requests the base station to change the TTI scheduling to a shorter TTI duration for this bearer. More specifically, the 5G MAC layer in the UE may send a message to the 5G MAC layer in the base station requesting the base station to change the TTI scheduling to a shorter TTI duration for this bearer.

At 3 the base station scheduler in the 5G layer requests the Phy portion (logic) to schedule the UE with a shorter transmit time interval (TTI) duration.

At 4 the base station schedules the UE using the shorter TTI.

At 5 the timer expires and the TCP layer in the UE sends notification to the base station to change to a normal TTI duration.

At 6 the UE requests the base station to change the TTI scheduling to a normal and more efficient TTI.

Some embodiments may be realized in any of the following forms:

In some embodiments, a wireless user equipment device (UE) may comprise a radio comprising one or more antennas configured for wireless communication on a cellular network, and a processing element operably coupled to the radio.

The UE may be configured to, prior to or during receipt of downlink communication from a cellular base station in the cellular network, transmit a message to the base station requesting the base station to change transmit time interval (TTI) scheduling to a shorter TTI duration.

The UE may be further configured to receive a message from the base station indicating that the UE should use a shorter TTI duration, wherein the message is provided from the base station in response to the message requesting the base station to change transmit time interval (TTI) scheduling to a shorter TTI duration.

The UE may be further configured to receive downlink communication frames from the base station.

The UE may be further configured to transmit acknowledge messages to the base station in response to receipt of each of the downlink communication frames, wherein the acknowledge messages are sent according to the shorter TTI duration for a first period of time, wherein the acknowledge messages are further useable by the base station to increase a congestion window during the first period of time.

The UE may be further configured to, after the first period of time, transmit a message to the base station requesting the base station to change transmit time interval (TTI) scheduling to a normal TTI duration.

In some embodiments, a wireless user equipment device (UE) may comprise a radio comprising one or more antennas configured for wireless communication on a cellular network, and a processing element operably coupled to the radio.

The UE may be configured to, at or before start of an uplink communication to a cellular base station in the cellular network, transmit a message to the base station requesting the base station to change transmit time interval (TTI) scheduling to a shorter TTI duration.

The UE may be further configured to receive a message from the base station indicating that the UE should use a shorter TTI duration, wherein the message is provided from the base station in response to the message requesting the base station to change transmit time interval (TTI) scheduling to a shorter TTI duration.

The UE may be further configured to transmit uplink communications to the base station according to the shorter TTI duration for a first period of time, wherein the UE is configured to increase a congestion window size after each acknowledgement of an uplink communication received by the base station.

The UE may be further configured to, after the first period of time, transmit a message to the base station requesting the base station to change transmit time interval (TTI) scheduling to a second TTI duration, wherein the second TTI duration is longer than the shorter TTI duration.

In some of the previous embodiments, transmission of the uplink communications to the base station according to the shorter TTI duration for the first period of time may allow transmission control protocol (TCP) communications to ramp up to higher speeds more quickly than if a normal TTI duration was used during the first period of time.

In some of the previous embodiments, transmission of the uplink communications to the base station according to the shorter TTI duration during the first period of time may result in a shorter round trip time (RTT) than if a normal TTI duration was used during the first period of time. In these embodiments, the UE may be further configured to increase a transmission rate after each uplink communication RTT.

In some of the previous embodiments, the first period of time ends in response to detection of a packet loss in the uplink communications.

In some of the previous embodiments, the first period of time ends in response to a threshold being reached.

In some of the previous embodiments, the congestion window size is maintained and used by the UE to avoid transmitting a greater amount of data than can be handled by the network. In these embodiments, the congestion window size may be increased after each round trip time, wherein increasing the congestion window size enables a corresponding increase in uplink data throughput.

In some of the previous embodiments, the UE may be further configured to set the congestion window size initially to a small multiple of a maximum segment size (MSS) allowed on a connection between the UE and the base station. In the embodiments, the UE may be further configured to increase the congestion window size after each acknowledgement of an uplink communication received by the base station, thereby increasing the congestion window size after each round trip time.

In some of the previous embodiments, the UE may be further configured to transmit the uplink communications to the base station according to the second TTI duration after the UE transmits the message to the base station requesting the base station to change transmit time interval (TTI) scheduling to the second TTI duration.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment device (UE), comprising:
   a radio, comprising one or more antennas configured for wireless communication on a cellular network;
   a processing element operably coupled to the radio;
   wherein the UE is configured to:
      detect that a transmission control protocol (TCP) session has been initiated;
      at least in part in response to detecting that the TCP session has been initiated, transmit a request to a base station for the base station to change transmission time interval (TTI) scheduling to a first shorter TTI duration;
      in response to transmitting the request to the base station to change TTI scheduling to the first shorter TTI duration, transmit first uplink communications to the base station according to the first shorter TTI duration for a first period of time, wherein the UE is configured to increase a congestion window size after each acknowledgement of a first uplink communication received by the base station during the first period of time, wherein increasing the congestion window size enables a corresponding increase in uplink data throughput;
      after the first period of time, transmit a request to the base station to change TTI scheduling to a second longer TTI duration; and
      in response to transmitting the request to the base station to change TTI scheduling to the second longer TTI duration, transmit second uplink communications to the base station according to the second longer TTI duration.

2. The UE of claim 1,
   wherein transmission of the first uplink communications to the base station according to the first shorter TTI duration during the first period of time results in a shorter round-trip time (RTT) than if the second longer TTI duration was used during the first period of time;
   wherein the UE is further configured to increase a transmission rate after each first uplink communication RTT during the first period of time.

3. The UE of claim 1,
   wherein the first period of time ends in response to detection of a packet loss in the first uplink communications.

4. The UE of claim 1,
   wherein the first period of time ends in response to a slow start threshold being reached.

5. The UE of claim 1,
   wherein the first period of time ends in response to the expiration of a timer.

6. The UE of claim 1, wherein the UE is further configured to:
   set the congestion window size initially to a small multiple of a maximum segment size (MSS) allowed on a connection between the UE and the base station.

7. The UE of claim 1, wherein the UE is further configured to:
   utilize contention based uplink resources allocated from the base station during the first period of time.

8. The UE of claim 1, wherein the UE is further configured to:
   in response to detecting that the TCP session has been initiated, notify a medium access control (MAC) layer of the UE to initiate a slow start procedure;
   wherein said transmitting the request to the base station for the base station to change TTI scheduling to the first shorter TTI duration is performed by the MAC layer to initiate the slow start procedure.

9. The UE of claim 8,
   wherein said notifying the MAC layer of the UE to initiate the slow start procedure is performed further in response to a determination by the UE that the TCP session is through a $5^{th}$ Generation (5G) network.

10. A method comprising:
    by a user equipment device (UE):
       detecting that a transmission control protocol (TCP) session has been initiated;
       at least in part in response to detecting that the TCP session has been initiated, transmitting a request to a base station for the base station to change transmission time interval (TTI) scheduling to a first shorter TTI duration;
       in response to transmitting the request to the base station to change TTI scheduling to the first shorter TTI duration, transmitting first uplink communications to the base station according to the first shorter TTI duration for a first period of time, wherein the UE is configured to increase a congestion window size after each acknowledgement of a first uplink communication received by the base station during the first period of time, wherein increasing the congestion window size enables a corresponding increase in uplink data throughput;
       after the first period of time, transmitting a request to the base station to change TTI scheduling to a second longer TTI duration; and
       in response to transmitting the request to the base station to change TTI scheduling to the second longer TTI duration, transmitting second uplink communications to the base station according to the second longer TTI duration.

11. The method of claim 10,
    wherein transmission of the first uplink communications to the base station according to the first shorter TTI duration during the first period of time results in a shorter round-trip time (RTT) than if the second longer TTI duration was used during the first period of time;
    wherein the method further comprises increasing a transmission rate after each first uplink communication RTT during the first period of time.

12. The method of claim 10,
    wherein the first period of time ends in response to one of:
       detection of a packet loss in the first uplink communications;
       a slow start threshold being reached; or
       expiration of a timer.

13. The method of claim 10, the method further comprising:
setting the congestion window size initially to a small multiple of a maximum segment size (MSS) allowed on a connection between the UE and the base station.

14. The method of claim 10, the method further comprising:
by the base station, configuring the UE with contention based uplink resources during the first period of time.

15. The method of claim 10, the method further comprising:
in response to detecting that the TCP session has been initiated, notifying a medium access control (MAC) layer of the UE to initiate a slow start procedure;
wherein said transmitting the request to the base station for the base station to change TTI scheduling to the first shorter TTI duration is performed by the MAC layer to initiate the slow start procedure.

16. The method of claim 15,
wherein said notifying the MAC layer of the UE to initiate the slow start procedure is performed further in response to a determination by the UE that the TCP session is through a $5^{th}$ Generation (5G) network.

17. An apparatus configured for implementation within a user equipment (UE), comprising:
one or more processing elements configured to cause the UE to:
detect that a transmission control protocol (TCP) session has been initiated;
at least in part in response to detecting that the TCP session has been initiated, transmit a request to a base station for the base station to change transmission time interval (TTI) scheduling to a first shorter TTI duration;
in response to transmitting the request to the base station to change TTI scheduling to the first shorter TTI duration, transmit first uplink communications to the base station according to the first shorter TTI duration for a first period of time, wherein the UE is configured to increase a congestion window size after each acknowledgement of a first uplink communication received by the base station during the first period of time, wherein increasing the congestion window size enables a corresponding increase in uplink data throughput;
after the first period of time, transmit a request to the base station to change TTI scheduling to a second longer TTI duration; and
in response to transmitting the request to the base station to change TTI scheduling to the second longer TTI duration, transmit second uplink communications to the base station according to the second longer TTI duration.

18. The apparatus of claim 17,
wherein the first period of time ends in response to one of:
detection of a packet loss in the first uplink communications;
a slow start threshold being reached; or
expiration of a timer.

19. The apparatus of claim 17, wherein the one or more processing elements are further configured to cause the UE to:
in response to detecting that the TCP session has been initiated, notify a medium access control (MAC) layer of the UE to initiate a slow start procedure;
wherein said transmitting the request to the base station for the base station to change TTI scheduling to the first shorter TTI duration is performed by the MAC layer to initiate the slow start procedure.

20. The apparatus of claim 19,
wherein said notifying the MAC layer of the UE to initiate the slow start procedure is performed further in response to a determination by the UE that the TCP session is through a $5^{th}$ Generation (5G) network.

* * * * *